United States Patent [19]

Dobson

[11] 4,378,245
[45] Mar. 29, 1983

[54] DISTILLATION PROCESS FOR SEPARATING SILVER AND COPPER CHLORIDES

[75] Inventor: Jerry E. Dobson, Tucson, Ariz.

[73] Assignee: Standard Oil Company (Indiana), Chicago, Ill.

[21] Appl. No.: 271,084

[22] Filed: Jun. 5, 1981

[51] Int. Cl.$^3$ .......................... C01G 3/05; C22B 15/08
[52] U.S. Cl. ....................................... 75/117; 423/44; 423/493; 203/94; 75/72
[58] Field of Search .................... 203/94; 423/44, 493; 75/117

[56] References Cited

U.S. PATENT DOCUMENTS 1,319,858 10/1919 Edwards .............................. 423/44
4,013,457 3/1977 Goens ................................. 423/493

FOREIGN PATENT DOCUMENTS 1523459 3/1968 France ................................ 423/493

OTHER PUBLICATIONS

Jolly, *The Synthesis and Characterization of Inorganic Compounds*, Prentice Hall, Englewood, N.J. (1970), pp. 85–91, 509–511.

*Primary Examiner*—Brian E. Hearn
*Attorney, Agent, or Firm*—James R. Henes; William H. Magidson; William T. McClain

[57] ABSTRACT

Purification of cuprous chloride is accomplished by distillation wherein cuprous chloride is recovered as the overhead product, and substantially all of the silver chloride and other impurities present report to the bottoms. Typical impurities in copper ore leach liquors include chlorides of silver, calcium, arsenic, bismuth, iron, nickel, lead, antimony, selenium, tellurium, silicon, mercury, manganese, tin, aluminum, magnesium, chromium, cobalt, cadmium, molybdenum, zinc and titanium, most of which may be excluded in large part by crystallization of cuprous chloride. Measurable amounts of these impurities, however, report to the crystals, and silver tends to co-precipitate with the copper in major amounts. Distillation accomplishes a high degree of copper-silver separation and substantial elimination of other impurities from the copper.

13 Claims, No Drawings

DISTILLATION PROCESS FOR SEPARATING SILVER AND COPPER CHLORIDES

DESCRIPTION

1. Technical Field

This invention relates to metallurgical separation processes, primarily the separation of cuprous chloride from silver chloride and other impurities.

2. Background Art and Prior Art Statement:

The recovery of metals from ores by chlorination is well known, and a variety of techniques have been taught for the chlorination of metals and separation of metal chlorides formed by such processes. Simultaneous chlorination and volatilization is a common technique. U.S. Pat. Nos. 3,998,926 and 4,086,084 teach the removal of silver and base metals from platinum group metal concentrates by heating the concentrates in the presence of a halogen at a temperature of greater than 900° C. in order to halogenate the silver and base metals present, allowing for their removal from the platinum group metals. U.S. Pat. No. 1,865,979 treats a copper ore with water and chlorine gas at a temperature of 675°–2500° F. in order to volatilize the metal chlorides formed. It further teaches successive temperature increases in order to separate lead chloride, silver chloride and gold chloride. U.S. Pat. No. 3,036,938 purifies copper powder by removing chloride impurities of copper chloride, aluminum chloride and/or iron chloride from wet precipitated copper by heating the copper in an inert gas to a temperature of 1500° F. In a similar manner, U.S. Pat. No. 3,988,415 recovers gold, silver and platinum from complex ores which have been chlorinated by heating to at temperature of between 1000°–1500° F. to drive off the gold and platinum, leaving the silver in the residue. However, none of these techniques for volatilizing metal chlorides can obtain a high degree of separation between two metal chlorides having relatively similar boiling points.

Two patents disclose distillation for separating specifically identified metal chloride values. U.S. Pat. No. 2,816,813 utilizes distillation to separate plutonium halides from light elements having atomic numbers 1–26 and having boiling points below the vaporization temperature of the plutonium halides. U.S. Pat. No. 3,618,923 discloses a distillation apparatus for distilling polonium from bismuth. The apparatus is disclosed as being suitable for the distillation of other low-melting metals such as magnesium, calcium, or zinc. However, in each of these patents the distillation process is utilized to separate compositions having fairly divergent boiling points.

Chlorination and chlorination of metals by leaching is also known in the art. For example, U.S. Pat. Nos. 3,972,711, 3,785,944 and 3,798,026 all utilize chloride leaches comprises of ferric chloride and/or cupric chloride as an initial step in obtaining metallic copper from copper bearing materials. The metallic copper is ultimately obtained from cuprous chloride produced during the leach or produced by the reduction of cupric chloride.

However, processes which convert copper to copper chloride will also convert any silver present to silver chloride. Copper chloride and silver chloride have such similar chemical and physical properties that it is extremely difficult to separate these two chlorides to ultimately obtain a pure copper or silver metal. Several processes for the separation of these two chlorides are taught, including U.S. Pat. No. 3,785,944 which suggests the use of electrolysis to remove the silver chloride from the leach solution. U.S. Pat. No. 3,880,732 suggests several techniques for separating cuprous chloride and silver chloride including converting the cuprous chloride to cupric chloride and separating cupric chloride from the silver chloride by the use of an anionic exchange resin. Alternatively, the cuprous chloride can be separated from the silver chloride by treating the mixture with sulfuric acid and air or oxygen in order to obtain copper sulfate and hydrochloric acid. The copper sulfate is separated from the silver chloride by crystallization. The process of U.S. Pat. No. 4,124,379 recovers silver from cuprous chloride solutions by contacting the solution with an amalgam of copper or a metal from Groups 2b, 4a, 5a, and 8b of the periodic table to replace the metal with silver. The silver amalgam is removed from the solution and the silver recovered. The copper chloride remaining in the solution can be processed for the recovery of elemental copper. Coprecipitation of sodium chloride and silver chloride is utilized in U.S. Pat. No. 4,101,315 to separate silver chloride from a cuprous chloride solution.

In accordance with the process of U.S. Pat. No. 3,972,711 a more selective crystallization of cuprous chloride from the leach solution is obtained by having a particular amount of cupric chloride present in the solution. This technique is beneficial particularly in the removal of antimony, bismuth and arsenic impurities from the cuprous chloride.

Finally, the use of hydrogen to reduce cuprous chloride to elemental copper is well known. Examples of such processes are disclosed in U.S. Pat. Nos. 4,039,324 and 4,192,676. The hydrogen reduction of copper salts to elemental copper in a fluidized bed is facilitated in U.S. Pat. No. 4,039,324 by conducting the process in the presence of chemically inert, relatively smooth, generally spherical particles to restrain sintering of the elemental copper. Copper is recovered from various copper salts by reducing the salts with hydrogen under turbulent conditions at a temperature greater than the melting point of copper, i.e. 1083° C., in the process of U.S. Pat. No. 4,192,676.

SUMMARY OF THE INVENTION

The process of the present invention comprises separating cuprous chloride in relatively pure form from a cuprous chloride-silver chloride mixture by means of distillation. Due to the similar boiling points of silver chloride and cuprous chloride the temperature and pressure of the distillation process must be carefully selected and controlled. The overhead cuprous chloride reflux ratio is maintained so as to effect the desired purity.

As a novel feature of the invention, the particular separation technique can be employed as an integral step of a number of processes. Solutions comprising relatively high concentrations of cuprous chloride in the presence of various metal chloride impurities may be processed in order to recover cuprous chloride of relatively high purity. The process is particularly applicable to recovering copper from copper sulfide ores by means of hydrometallurgical chloride techniques. For example, copper sulfides are leached with ferric and/or cupric chloride in order to produce a solution comprising ferrous chloride, cuprous chloride and optionally cupric chloride, along with various metal impurities including silver chloride. The cuprous chloride and silver chloride are removed from the solution by means of crystallization, and the crystals of cuprous chloride and silver chloride are then melted and introduced into a distillation column wherein the cuprous chloride is recovered as the overhead product. The recovered cuprous chloride is then further treated for the production of copper. The mother liquor from the crystallization stage is preferably treated for impurities removal and leachant regeneration. Due to the high purity of the resulting product, subsequent conventional copper purification techniques can generally be avoided.

DESCRIPTION OF THE PREFERRED EMBODIMENTS

Copper and silver often occur naturally in association with each other, generally in the form of sulfides and oxides. Numerous processes exist for recovering these values from their native ores, and the process of the present invention is suitable for the separation of copper from silver in conjunction with essentially any beneficiation process. Depending upon the process, at some convenient stage the copper and silver values must be converted to their respective chlorides, and this may be accomplished even though the copper and silver minerals are associated with various other impurities.

Metallic impurities commonly associated with copper and silver minerals include arsenic, bismuth, iron, nickel, lead, antimony, tellurium, selenium, silicon, manganese, tin, aluminum, magnesium, chromium, cobalt, cadmium, molybdenum, titanium and zinc. The present process is not only useful for separating silver chloride from copper chloride, but also substantial portions of these impurities in the form of chlorides or pyrolyzed hydrolysates.

The impure copper chlorides are introduced into a suitable distillation column. The column is preferably equipped with a reflux condenser, and preferably a means for producing vacuum.

The temperature and pressure of the distillation are, of course, interrelated. The temperature and pressure must be selected in conjunction with other design variables affecting the separation. Due to the relatively high boiling points of cuprous chloride and silver chloride, a liquid bottoms reflux may be incorporated in order to increase the amount of cuprous chloride reporting to the overhead. Generally the refluxing bottoms composition is fixed by the slow withdrawal of a small portion of this silver-enriched residue. Preferably the silver content in the bottoms is at least about one weight percent, more preferably at least about three percent and most preferably up to about five percent. It is generally preferred to conduct the distillation under vacuum. Hence, preferably the pressure in maintained at less than 400 mm Hg and the temperature is maintained from about 1050° C. to about 1350° C., more preferably the pressure is maintained at less than about 100 mm Hg and the temperature is maintained from about 950° C. to about 1050° C., and most preferably the pressure is maintained at less than about 40 mm Hg and the temperature is maintained from about 420° C. to about 950° C. The process works well at pressures from about 1 to about 5 mm Hg, and temperatures from about 600° C. to 750° C.

The overhead vapor reflux ratio is important from a cuprous chloride product purity standpoint. From a practical standpoint the cuprous chloride purity is substantially enhanced with a reflux ratio up to about 3, more preferably from about 0.5 to about 3, and most preferably from about 1 to about 3.

The cuprous chloride product may then be subjected to reduction in order to recover elemental copper. Conventional techniques may be employed, such as hydrogen reduction and electrolysis.

Due to the high purity of the cuprous chloride produced, additional purification is generally not necessary following the reduction step. However, such techniques as electrorefining and fire refining may be employed to achieve even higher purity of desired.

As a further novel aspect of the invention, the distillation technique is incorporated into a copper recovery scheme in order to produce elemental copper from copper sulfide ores. A preferred process includes concentrating the ore, leaching the concentrate with ferric chloride and/or cupric chloride to produce a solution comprising cuprous chloride, ferrous chloride, and the chloride-soluble impurities, including silver, existing in the concentrate. Silver chloride commonly co-precipitates with the cuprous chloride. The balance of the metal chloride impurities remain substantially in solution, although at least minor fractions of essentially all of the chloride impurities generally precipitate. These impurities include arsenic, bismuth, iron, nickel, lead, antimony, selenium, tellurium, silicon, manganese, tin, aluminum, magnesium, chromium, cobalt, cadmium, molybdenum, mercury, titanium, zinc and calcium.

The resulting crystals are then washed and melted, and subjected to the distillation process as hereinabove described.

A bleed stream may be taken from the distilled cuprous chloride product to control any impurities such as mercury, cadmium, lead and zinc, which do not separate well during distillation. The cuprous chloride crystals resulting from the distillation overhead can then be reduced to elemental copper as described hereinabove. The mother liquour from the crystallization stage may be further treated for impurities removal and subjected to oxidation in order to convert the ferrous chloride to ferric chloride and the remaining cuprous chloride to cupric chloride for contact as desired with fresh feed material.

EXAMPLES

EXAMPLE 1

Purified cuprous chloride crystals were mixed with impurities to raise the level of each impurity to at least 100 ppm. Silver was present in the crystals at more than 200 ppm, and iron was present at 308 ppm. The crystals were distilled in a fractional distillation apparatus having a large lower pot leading to the distillation column, and a side arm take-off on the column having an opening leading to a vacuum system producing a vacuum of between 1 and 5 mm of mercury. Heat was supplied to the apparatus so as to produce a temperature of 700° C. to 750° C. at the bottom of the column, and 600° C. to 650° C. at the top of the column. Samples of the distillate were taken at intervals during the process and spectrographically analyzed for their impurities content. Results are set forth in Table 1. (Entries of ">60" indicate maximum levels of calibration. The <0 indicate a higher purity than the spectrographic standards.)

TABLE 1

| Sample No. | Ag | As | Bi | Fe | Ni | Pb | Sb | Se | Te | Si |
|---|---|---|---|---|---|---|---|---|---|---|
| 1 | 22.3 | 16.4 | >60 | 15.3 | 1.83 | >60 | 7.24 | <0 | 3.70 | .735 |
| 2 | 19.8 | <0 | 27.5 | 9.93 | 1.51 | >60 | 4.13 | <0 | 2.64 | <0 |
| 3 | 21.3 | 4.29 | 24.5 | 14.3 | 2.13 | >60 | 6.95 | <0 | 4.14 | <0 |
| 4 | 20.8 | <0 | 8.66 | 11.0 | 2.71 | >60 | 7.10 | <0 | 4.79 | <0 |
| 5 | 26.4 | <0 | 2.12 | 14.1 | 3.74 | >60 | 7.04 | <0 | 4.28 | <0 |
| 6 | 25.2 | .637 | 11.7 | 15.5 | 3.10 | >60 | 5.20 | <0 | 3.68 | <0 |
| 7 | 32.9 | <0 | 17.2 | 23.6 | 4.26 | >60 | 4.11 | <0 | 1.40 | <0 |
| 8 | 30.5 | 5.92 | 3.73 | 29.1 | 2.77 | >60 | 2.43 | <0 | 2.10 | <0 |
| 9 | 43.6 | <0 | 9.15 | 40.7 | 4.91 | >60 | 4.42 | <0 | 2.76 | <0 |
| 10 | 41.4 | <0 | 7.32 | 40.8 | 4.21 | >60 | 5.88 | <0 | 3.40 | <0 |
| 11 | 47.1 | <0 | 6.41 | 65.6 | 2.82 | >60 | 5.62 | <0 | 3.11 | <0 |

| Sample No. | Mn | Sn | Al | Mg | Cr | Co | Cd | Mo | Ca |
|---|---|---|---|---|---|---|---|---|---|
| 1 | 2.35 | >60 | <0 | .165 | .049 | 1.58 | >60 | 3.03 | .353 |
| 2 | 4.62 | 44.6 | <0 | <0 | <0 | 1.96 | >60 | 1.69 | <0 |
| 3 | 5.25 | 52.2 | <0 | <0 | <0 | 2.36 | >60 | 2.10 | <0 |
| 4 | 5.86 | 51.0 | <0 | <0 | .178 | 3.73 | >60 | 2.75 | <0 |
| 5 | 6.99 | 58.7 | <0 | <0 | .107 | 4.78 | >60 | 6.76 | <0 |
| 6 | 6.03 | 50.0 | <0 | <0 | <0 | 4.89 | >60 | 2.94 | <0 |
| 7 | 5.49 | >60 | <0 | <0 | .017 | 6.57 | >60 | 5.08 | 1.07 |
| 8 | 6.24 | 47.7 | <0 | .306 | <0 | 7.40 | >60 | 3.01 | <0 |
| 9 | 7.95 | 49.5 | <0 | <0 | <0 | 10.2 | >60 | 6.87 | <0 |
| 10 | 4.91 | 24.4 | <0 | <0 | .049 | 7.34 | >60 | 7.45 | <0 |
| 11 | 3.46 | 29.7 | <0 | <0 | <0 | 6.22 | >60 | 11.6 | <0 |

EXAMPLE 2

Cuprous chloride was crystallized from leach solutions resulting from a copper recovery process in which copper-containing ores were leached with ferric and cupric chlorides to produce solutions comprising ferrous, cuprous and cupric chlorides, along with naturally occurring impurities. Data showing the ability of the crystallization process to separate cuprous chloride from various impurities at various typical levels of such impurities is summarized in Table 2. The table summarizes data from a number of tests, and shows how the level of each impurity in the crystals varies with the concentration of that impurity in the head solution, independent of the level of other impurities in the head solution.

TABLE 2

| Impurities in CuCl (ppm) | Impurities in Head (g/l) | | | | | |
|---|---|---|---|---|---|---|
| | .1 | .2 | .5 | 1.0 | 2.0 | 2.4 |
| Ag | —* | 700 | 1100 | 2000 | 3700 | 4500 |
| As | 5 | 5.5 | 5.5 | 5.0 | 6.5 | 7.0 |
| Bi | — | — | 0.5 | 1.5 | 3.5 | 4.0 |
| Ni | — | — | 2.5 | 2.0 | 2.0 | 1.5 |
| Pb | — | 2.5 | 3.5 | 5.0 | 11.0 | 13.5 |
| Sb | 5 | 8.5 | 15.5 | 30.0 | — | — |
| Sn | 11.5 | 12.0 | 13.0 | 14.5 | 18.0 | 19.5 |
| Cr | — | — | 3.0 | 7.0 | 14.5 | 18.5 |
| Co | — | 1.0 | 1.0 | 1.5 | 2.0 | 2.5 |
| Cd | — | — | 0.5 | 1.5 | 3.2 | 4.1 |
| Mn | — | — | 1.0 | 3.5 | 7.5 | 10.0 |
| Ca | 4700 | 5500 | 6500 | 10,000 | — | — |
| Na | 42.0 | 44.0 | 49.0 | — | — | — |
| K | 42.0 | 47.0 | >50 | — | — | — |

*"—" indicates no measurement was taken.

EXAMPLE 3

Samples of cuprous chloride crystals resulting from a copper recovery process comprising leaching copper-containing ores with ferric and cupric chloride to produce a solution comprising ferrous, cuprous, and cupric chlorides along with naturally occurring impurities, and crystallizing cuprous chloride containing co-crystallized impurities as shown in Table 2 therefrom, were distilled by the process of the present invention as described in Example 1 and the resultant distillate spectrographically analyzed for impurities. Results are set forth in Table 3.

TABLE 3

| | Impurities | | | | | | | | | | | | | | | | | | |
|---|---|---|---|---|---|---|---|---|---|---|---|---|---|---|---|---|---|---|---|
| | Ag | As | Bi | Ni | Pb | Sb | Se | Te | Fe | Si | Mn | Sn | Al | Mg | Cr | Co | Cd | Mo | Ti |
| Head | >150 | 4.00 | .566 | 1.94 | 1.12 | 5.69 | 0 | 2.67 | >60.0 | 29.5 | .401 | 11.1 | 7.79 | 1.59 | 0 | .742 | 1.26 | 5.87 | 6.14 |
| Test 1* | 4.84 | 0 | .722 | .093 | .004 | .898 | 0 | .994 | 1.73 | 32.9 | .199 | 2.42 | 5.20 | 1.64 | 0 | 0 | .586 | 0 | 2.90 |
| Test 2** | 0 | 2.76 | 1.81 | >60.0 | 2.76 | 11.9 | 0 | 6.75 | >60.0 | 8.94 | 12.2 | 12.9 | 5.50 | 3.83 | >60.0 | 4.20 | 2.81 | 14.7 | 14.5 |

*Glass parts used in distillation
**Stainless steel parts used in distillation, accounts for higher levels of Ni, Fe, Co, Sb and Cr

EXAMPLE 4

Distillation was performed as described in Example 1. At a relatively constant pressure, the distillation rate was controlled to a relatively stable base value by adding heat to the larger pot. A condenser at the top of the distillation column was then cooled to vary the reflux ratio, L/D, which was calculated as percent decrease in rate. The distillate was assayed for silver content at various stages. Results are shown on Table 4.

TABLE 4

| Sample | | Rate (lb/hr) | Reflux Ratio (L/D) | Ag Assay (ppm) |
|---|---|---|---|---|
| Test 1 | 1 | 13 | Max. | 56.8 |
| | 2 | 12 | Max. | 63.1 |
| | 3 | 10 | 0 | 187.4 |
| | 4 | 7 | Max. | 71.5 |
| Test 2 | 1 | 6 | 0 | 3.86 |
| | 2 | 9 | 0 | 10.3 |
| | 3 | 10 | 0 | 18.6 |
| | 4 | 8 | .2 | 17.1 |
| | 5 | 22 | 0 | 10.5 |
| Test 3 | 1 | 12 | 0 | 43 |
| | 2 | 13 | 0 | 109 |
| | 4 | 6 | 1 | 8 |
| | 5 | 11 | 0 | 200 |
| | 6 | 5 | 1.3 | 15 |
| Test 4 | 1 | 18 | 0 | 20 |
| | 2 | 10 | 0.8 | 1.8 |
| | 3 | 10 | 0.8 | 3.2 |
| | 4 | 13 | 0 | 26 |
| | 5 | 6.5 | 1.0 | 9.3 |
| Test 5 | 1 | 25 | 0 | 53 |
| | 2 | 21 | 0 | 15 |
| | 3 | 17 | 0.25 | 12 |
| | 4 | 10 | 1.1 | 7 |
| | 5 | 21 | 0 | 55 |

What is claimed is:

1. A process for separating cuprous chloride from a mixture comprising cuprous chloride and silver chloride comprising subjecting the mixture to distillation within suitable processing conditions so as to effect the separation.

2. A process for recovering cuprous chloride from a chloride solution comprising cuprous chloride and silver chloride comprising:
    (a) crystallizing at least a portion of the cuprous chloride and silver chloride from the solution;
    (b) heating the crystals to form a liquid; and
    (c) distilling the liquid to recover cuprous chloride.

3. A process for separating cuprous chloride from a chloride solution comprising cuprous chloride and silver chloride and one or more impurities selected from the group consisting of calcium chloride, arsenic chloride, bismuth chloride, iron chloride, nickel chloride, antimony chloride, selenium chloride, tellurium chloride, silicon chloride, mercury chloride, manganese chloride, tin chloride, aluminum chloride, magnesium chloride, chromium chloride, cobalt chloride, cadmium chloride, molybdenum chloride, zinc chloride and titanium chloride comprising:
    (a) crystallizing at least a portion of the cuprous chloride from solution to the exclusion of at least a portion of the impurities;
    (b) heating the crystals to form a liquid; and
    (c) distilling the liquid to recover cuprous chloride to the substantial exclusion of silver chloride and the impurity chlorides.

4. A process for purifying cuprous chloride crystals comprising subjecting the cuprous chloride to distillation under processing conditions so as to recover a substantial portion of the cuprous chloride as the overhead product while isolating at least a portion of the impurities in the liquid bottoms, wherein the distillation is performed at a pressure of less than 400 mm Hg.

5. The process of claim 4 in which silver chloride is an impurity present at concentrations greater than about 10 ppm, and is reduced to concentrations of at most about 10 ppm in the overhead cuprous chloride product.

6. The process of claim 4 in which the impurities are selected from the group consisting of the chlorides of silver, calcium, arsenic, bismuth, iron, nickel, antimony, selenium, tellurium, silicon, manganese, chromium, cobalt, molybdenum and titanium.

7. The process of claim 4 in which the distillation is performed at a pressure of less than about 40 mm Hg.

8. The process of claim 4 in which the distillation is performed with a reflux ratio of between about 0.5 and about 3.

9. A process for recovering copper from copper sulfide concentrates comprising:
    (a) leaching the concentrates with a suitable chloride leaching agent in order to convert at least a portion of the copper to copper chloride;
    (b) crystallizing at least a portion of the copper chloride from solution;
    (c) subjecting the copper chloride crystals to distillation under processing conditions so as to recover a substantial portion of the copper chloride as the distillate; and
    (d) treating the distillate copper chloride to produce elemental copper.

10. A process for recovering copper from copper-containing ore concentrates comprising:
    (a) leaching the concentrate with ferric chloride and/or cupric chloride to produce a solution comprising cuprous chloride, ferrous chloride and chloride-soluble impurities selected from the group consisting of salts of silver, calcium, arsenic, bismuth, iron, nickel, lead, antimony, selenium, tellurium, silicon, manganese, tin, aluminum, magnesium, chromium, cobalt, cadmiun, mercury, molybdenum, zinc and titanium;
    (b) crystallizing at least a portion of the cuprous chloride from solution to the exclusion of at least a portion of the impurities;
    (c) heating the crystals to form a liquid;
    (d) distilling the liquid to recover cuprous chloride to the substantial exclusion of the impurities; and
    (e) converting the recovered cuprous chloride to elemental copper.

11. The process of claim 10 in which step (e) is accomplished by hydrogen reduction.

12. The process of claim 10 in which following step (b) the mother liquor is further processed for impurities removal, subjected to oxidation, and recycled for contact with fresh feed.

13. The process of claim 10 in which the final copper product contains less than 10 ppm silver.

* * * * *

UNITED STATES PATENT OFFICE
CERTIFICATE OF CORRECTION

Patent No. 4,378,245                    Dated March 29, 1983

Inventor(s) JERRY E. DOBSON

It is certified that error appears in the above-identified patent and that said Letters Patent are hereby corrected as shown below:

Patent reads

| Col. | Line | |
|---|---|---|
| 7 | 16 | PTO skipped line in table, should read -- 3 12 0.1 57 -- |
| 1 | 34 | "to at temperature" should read -- to a temperature -- |
| 1 | 56 | "comprises" should read -- comprised -- |
| 4 | 67 | "The" should read -- Those -- |
| 8 | 18 | "claim 4" should read -- claim 1,2,3,4,5,6,7,9,10, 12, or 13 -- |

Signed and Sealed this

Seventh Day of February 1984

[SEAL]

Attest:

GERALD J. MOSSINGHOFF

Attesting Officer    Commissioner of Patents and Trademarks